(12) United States Patent
Ramiro Moreno et al.

(10) Patent No.: US 11,792,656 B2
(45) Date of Patent: Oct. 17, 2023

(54) DETERMINING CELL SUITABILITY FOR MULTIPLE-INPUT MULTIPLE-OUTPUT DEPLOYMENT

(71) Applicant: Telefonaktiebolaget LM Ericsson (publ), Stockholm (SE)

(72) Inventors: Juan Ramiro Moreno, Malaga (ES); Paulo Antonio Moreira Mijares, Malaga (ES); Jose Outes Carnero, Torremolinos (ES); Miguel Angel Regueira Caumel, Malaga (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 444 days.

(21) Appl. No.: 17/284,845

(22) PCT Filed: Jan. 25, 2019

(86) PCT No.: PCT/EP2019/051897
§ 371 (c)(1),
(2) Date: Apr. 13, 2021

(87) PCT Pub. No.: WO2020/078590
PCT Pub. Date: Apr. 23, 2020

(65) Prior Publication Data
US 2021/0385666 A1    Dec. 9, 2021

(30) Foreign Application Priority Data
Oct. 15, 2018 (EP) .................................... 18382735

(51) Int. Cl.
*H04W 16/00* (2009.01)
*H04W 16/22* (2009.01)
(Continued)

(52) U.S. Cl.
CPC .......... *H04W 16/22* (2013.01); *H04B 7/0452* (2013.01); *H04B 17/318* (2015.01); *H04W 16/18* (2013.01); *G06N 20/00* (2019.01)

(58) Field of Classification Search
CPC .......... G06N 3/02; G06N 7/046; G06N 20/00; G06S 7/417; H04B 7/0413; H04B 7/0452;
(Continued)

(56) References Cited

U.S. PATENT DOCUMENTS

| 8,019,352 B2 * | 9/2011 | Rappaport | ............ H04W 64/00 342/450 |
| 2004/0143428 A1 * | 7/2004 | Rappaport | .............. H04L 41/12 703/22 |

(Continued)

FOREIGN PATENT DOCUMENTS

| WO | WO 2015/106237 | * | 7/2015 |

OTHER PUBLICATIONS

Bai et al., Predicting Wireless MmWave Massive MIMO Channel Characteristics Using Machine Learning Algorithms, Hindawi, 13 pages, Aug. 2018.*

(Continued)

*Primary Examiner* — Frank Duong
(74) *Attorney, Agent, or Firm* — Christopher & Weisberg, P.A.

(57) ABSTRACT

There is provided a method for determining a suitability of a cell of a network for deployment as a Multiple-Input Multiple-Output (MIMO) cell. The method includes acquiring data associated with a cell of a network and processing the acquired data associated with the cell of the network using a first machine learnt model to obtain one or more metrics indicative of the suitability of the cell for deployment as a MIMO cell. The method also includes generating
(Continued)

an indication of whether the cell is suitable for deployment as a MIMO cell based on the one or more obtained metrics.

20 Claims, 7 Drawing Sheets

(51) Int. Cl.
  *H04B 17/318* (2015.01)
  *H04B 7/0452* (2017.01)
  *H04W 16/18* (2009.01)
  *G06N 20/00* (2019.01)
(58) Field of Classification Search
  CPC .......... H04B 17/318; H04L 2012/5686; H04L 25/0254; H04L 25/03165; H04L 25/03464; H04L 2025/03554; H04L 41/16; H04W 16/18; H04W 16/22
  See application file for complete search history.

(56) References Cited

U.S. PATENT DOCUMENTS

2004/0259555 A1* 12/2004 Rappaport ............ H04W 16/18
  455/446
2019/0356516 A1* 11/2019 Cao ...................... H04L 25/0256
2019/0372644 A1* 12/2019 Chen ..................... H04W 88/12
2020/0304219 A1* 9/2020 Park ..................... H04B 17/309

OTHER PUBLICATIONS

International Search Report and Written Opinion dated Jun. 4, 2019 for International Application No. PCT/EP2019/051897 filed on Jan. 25, 2019, consisting of 10—pages.
Jens Voigt et al.; Optimal Antenna Type Selection in a Real SU-MIMO Network Planning Scenario; IEEE 70th Vehicular Technology Conference Fall (VTC 2009—Fall), Sep. 2009, consisting of 5—pages.
Siming Zhang et al.;, Evaluating Realistic Performance Gains of Massive Multi-User MIMO System in Urban City Deployments, 23rd International Conference on Telecommunications (ICT), Communication Systems and Networks Group, 2016, consisting of 6—pages.
3GPP TSG RAN WG1 meeting #52bis Ri-08xxxx; Title: Overhead Reduction for BF; Source: CATT; Agenda Item: 6.1.1; Document for: Discussion and Decision; Date and Location: Mar. 31-Apr. 4, 2008, Shenzhen, China, consisting of 8—pages.
Kwihoon Kim et al.; Title: Output—The FG-ML5G draft, "Use cases for Machine Learning for Future Networks Including 5G"; Source: Editors; Telecommunication Standardization Sector Study Period 2017-2020; Focus Group; Date and Location: Apr. 26-27, 2018, Xi'an, China 24, consisting of 71—pages.

* cited by examiner

DETERMINING CELL SUITABILITY FOR MULTIPLE-INPUT MULTIPLE-OUTPUT DEPLOYMENT

CROSS-REFERENCE TO RELATED APPLICATIONS

This application is a Submission Under 35 U.S.C. § 371 for U.S. National Stage Patent Application of International Application No.: PCT/EP2019/051897, filed Jan. 25, 2019 entitled "DETERMINING CELL SUITABILITY FOR MULTIPLE-INPUT MULTIPLE- OUTPUT DEPLOYMENT," which claims priority to European Application No.: 18382735.1, filed Oct. 15, 2018, the entireties of both of which are incorporated herein by reference.

TECHNICAL FIELD

The disclosure relates to a system and method for determining a suitability of a cell of a network for deployment as a Multiple-Input Multiple-Output (MIMO) cell.

BACKGROUND

The world's total amount of traffic over Long Term Evolution (LTE) networks grew from 6.5 billion PB/m in 2016 to 11 billion PB/m in 2017, and the second generation/third generation/fourth generation (2G/3G/4G) traffic volume is forecasted to grow by a factor of 8 between 2017 and 2023. Such dramatic growth poses some challenges for networks in terms of capacity, since networks will have to carry a massive amount of additional traffic without compromising quality or coverage.

To increase capacity, there are three main non-mutually exclusive areas that can be addressed:
  Cell density, by means of the addition of new macro and small cells. It is well known that radio capacity can be easily increased by means of the addition of new cells.
  Spectrum increase. Depending on the frequency band, new spectrum can be exploited by means of new standalone layers, combination of layers through carrier aggregation or, in some cases, the exploitation of un-licensed spectrum by means of license assisted access.
  Techniques that increase the spectral efficiency of currently deployed assets (mainly sites and spectrum). Among those techniques, Radio Access Network (RAN) coordination and Massive MIMO (M-MIMO) can be mentioned.

This disclosure is related to MIMO and M-MIMO, as techniques to increase spectral efficiency. More specifically, it is related to the process to design and plan the introduction of this technology in cellular networks.

When planning for MIMO and M-MIMO, designers need to consider that there are two main levers to achieve performance improvement: beam steering and multi-layer transmission. Focusing on multi-layer transmission, there are two main requisites for this technique to be fully exploited in a certain site location, thereby justifying the investment associated with the deployment of a more advanced antenna system. One of the requisites is the existence of enough Signal to Noise Ratio (SNR) in a sufficiently large portion of the cell. This is straightforward to verify with currently available observability. The second requisite is less straightforward to verify, and it is about the suitability of the propagation environment to generate relatively isolated propagation paths that allows for parallel multi-layer transmission. The number of parallel transmission layers that can be achieved towards a certain user location is generally referred to as the "channel rank".

Nowadays, the assessment of the suitability of the propagation environment for parallel multi-layer transmission is carried out mostly by simulating the propagation environment with ray tracing engines. That is, the assessment of the channel rank distribution that can be expected when implementing an advanced antenna system (e.g. a 4×4 MIMO system, or M-MIMO system) in a certain location is carried out by means of simulations of the propagation environment with ray tracing techniques [1], [2]. However, such an approach has the following drawbacks:
  Detailed three-dimensional (3D) databases of the areas of interest are needed, which are expensive and often cumbersome to handle and obtain.
  Lack of accuracy, due to not fully up-to-date databases or lack of enough detail in the modelling of the different materials that will impact the radio propagation channel.
  Need for assumptions in the spatial user distribution, which will deeply affect the overall cell performance. If users are mainly gathering in an area with high channel rank, MIMO gains will be larger, even though there are larger areas with poor MIMO performance but very small density of users.
  Need for sophisticated algorithms, which may lead to very high computation times.
  Due to all these limitations, it is difficult to scale and industrialize this aspect of the design process at a reasonable cost.

Of course, a more primitive approach for assessing propagation environment suitability is to follow a trial and error deployment approach in locations with capacity problems. However, such a scheme is cumbersome, costly in terms of deployment cost and involves a long time to market. As such, there is a need for an improved technique for determining a suitability of a cell of a network for deployment as a MIMO cell, which overcomes at least some of the problems associated with existing techniques.

SUMMARY

It is an object of the idea to obviate or eliminate at least some of the above disadvantages associated with existing techniques and provide an improved technique for determining a suitability of a cell of a network for deployment as a MIMO cell.

Therefore, according to an aspect of the idea, there is provided a method for determining a suitability of a cell of a network for deployment as a Multiple-Input Multiple-Output (MIMO) cell. The method comprises acquiring data associated with a cell of a network and processing the acquired data associated with the cell of the network using a first machine learnt model to obtain one or more metrics indicative of the suitability of the cell for deployment as a MIMO cell. The method also comprises generating an indication of whether the cell is suitable for deployment as a MIMO cell based on the one or more obtained metrics.

In some embodiments, the first machine learnt model may comprise a neural network model. In some embodiments, the first machine learnt model may comprise a deep neural network model.

In some embodiments, the method may comprise acquiring at least one map of the cell of the network and processing the at least one acquired map of the cell of the network using a second machine learnt model to extract one or more features of the cell of the network. In these embodiments, the second machine learnt model may be different to the first machine learnt model and the acquired data associated with the cell of the network may comprise the one or more extracted features of the cell of the network.

In some embodiments, the second machine learnt model may comprise a neural network model. In some embodiments, the second machine learnt model may comprise a convolutional neural network model.

In some embodiments, the second machine learnt model may be trained based on one or more other networks. In some embodiments, the second machine learnt model may be trained based on at least one other network after deployment of the at least one other network as a MIMO network. In some embodiments, the method may comprise adjusting one or more inputs of the second machine learnt model to compensate for the deployment of the at least one other network as a MIMO network. In some embodiments, the adjustment may be based on any one or more of advice acquired from an expert and an observed behaviour of the at least one other network after temporarily deactivating the deployment of the at least one other network as a MIMO network. In some embodiments, the second machine learnt model may be trained based on the at least one other network prior to deployment of the at least one other network as the MIMO network. In some embodiments, the method may comprise updating the second machine learnt model based on whether the cell is suitable for deployment as a MIMO cell.

In some embodiments, the method may comprise acquiring at least one map of the cell of the network and processing the at least one acquired map of the cell of the network to convert the at least one acquired map into a data set, wherein the acquired data associated with the cell of the network may comprise the data set.

In some embodiments, the at least one acquired map of the cell of the network may comprise any one or more of a clutter map of the cell of the network and an elevation map of the cell of the network.

In some embodiments, the method may comprise determining a geolocation of at least one call within the cell of the network based on one or more traces of the at least one call and estimating a pixel value of the at least one acquired map of the cell of the network in the determined geolocation. In these embodiments, processing the data associated with the cell of the network may comprise processing the data associated with the cell of the network and the estimated pixel value of the at least one acquired map using the first machine learnt model to obtain the one or more metrics indicative of the suitability of the cell for deployment as a MIMO cell.

In some embodiments, the acquired data associated with the cell of the network may comprise data indicative of one or more properties of the cell of the network. In some embodiments, the one or more properties of the cell of the network may comprise any one or more of a topology of the cell of the network, one or more physical properties of the cell of the network, one or more configuration management parameters of the cell of the network, one or more performance management counters of the cell of the network, one or more traces of at least one call within the cell of the network, a reference signal strength statistical measurement for the cell of the network, a reference signal quality statistical measurement for the cell of the network, a signal quality statistical measurement for the cell of the network, a timing advance statistical measurement for the cell of the network, a load of the cell of the network, statistics on a capability of at least one user equipment in the cell of the network to support deployment of the cell as a MIMO cell, a reference signal strength statistical measurement for the cell of the network for a predefined reference signal quality range, and a reference signal quality statistical measurement for the cell of the network for a predefined reference signal strength range.

In some embodiments, the first machine learnt model may be trained based on one or more other networks. In some embodiments, the first machine learnt model may be trained based on at least one other network after deployment of the at least one other network as a MIMO network. In some embodiments, the method may comprise adjusting one or more inputs of the first machine learnt model to compensate for the deployment of the at least one other network as a MIMO network. In some embodiments, the adjustment may be based on any one or more of advice acquired from an expert and an observed behaviour of the at least one other network after temporarily deactivating the deployment of the at least one other network as a MIMO network. In some embodiments, the first machine learnt model may be trained based on the at least one other network prior to deployment of the at least one other network as the MIMO network.

In some embodiments, the method may be performed for each call within the cell of the network to generate a plurality of partial indications of whether the cell is suitable for deployment as a MIMO cell and the method may comprise aggregating the plurality of partial indications to generate an overall indication of whether the cell is suitable for deployment as a MIMO cell.

In some embodiments, one or more properties of the cell of the network may comprise one or more key performance indicators associated with the cell of the network. In some embodiments, one or more key performance indicators associated with the cell of the network may be generated by combining one or more performance management counters of the cell of the network and/or using one or more traces of at least one call within the cell of the network.

In some embodiments, the method may comprise updating the first machine learnt model based on whether the cell is suitable for deployment as a MIMO cell.

In some embodiments, the method may be performed for each cell of the network.

In some embodiments, the MIMO cell may be a massive MIMO cell.

According to another aspect of the idea, there is provided a computer program comprising instructions which, when executed by processing circuitry, cause the processing circuitry to perform the method described above.

According to another aspect of the idea, there is provided a computer program product, embodied on a non-transitory machine-readable medium, comprising instructions which are executable by processing circuitry to cause the processing circuitry to perform the method described above.

According to another aspect of the idea, there is provided a system configured to operate in accordance with the method described above.

In some embodiments, the system comprises processing circuitry and at least one memory for storing instructions which, when executed by the processing circuitry, cause the system to operate in accordance with the method described above.

In some embodiments, the system may be implemented as a node or a data center.

Therefore, an improved technique for determining a suitability of a cell of a network for deployment as a MIMO cell is provided.

BRIEF DESCRIPTION OF THE DRAWINGS

For a better understanding of the idea, and to show how it may be put into effect, reference will now be made, by way of example, to the accompanying drawings, in which.

DETAILED DESCRIPTION

As mentioned earlier, there is described herein an improved technique for determining a suitability (or eligibility) of a cell of a network for deployment as a MIMO cell. Herein, a MIMO cell can be defined as any cell that that has a MIMO configuration, such as any cell that has a higher number of elements than 2×2 according to some embodiments. That is, according to some embodiments, a MIMO cell may be defined as a cell that has more than two transmitting antennas and/or more than two receiving antennas. For example, a MIMO cell can be a 4×4 MIMO cell, which comprises four transmitting antennas and four receiving antennas. In some embodiments, the MIMO cell referred to herein can be a massive MIMO cell.

Figure 1:
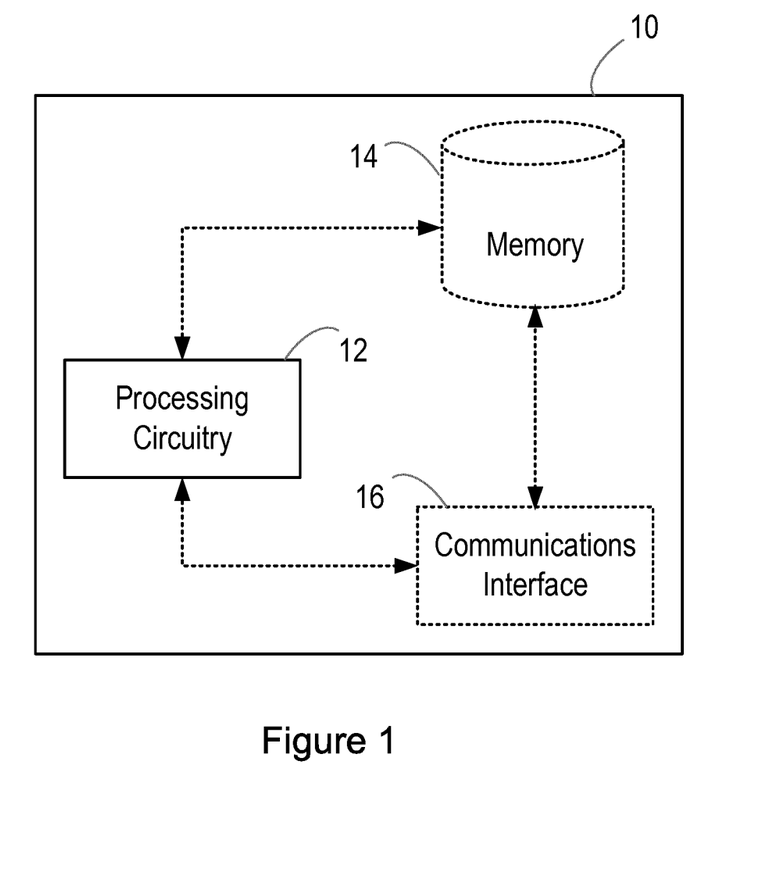
FIG. 1 is a block diagram illustrating a system according to an embodiment.

FIG. 1 illustrates a system 10 in accordance with an embodiment. Generally, the system 10 is for determining a suitability (or eligibility) of a cell of a network for deployment as a MIMO cell. In some embodiments, the system 10 can be implemented as a node. In other embodiments, the system 10 can be implemented as a data center (e.g. as a cloud implementation). A data center may comprise multiple databases and a distributed computing or processing system.

As illustrated in FIG. 1, the system 10 comprises processing circuitry (or logic) 12. The processing circuitry 12 controls the operation of the system 10 and can implement the method described herein. The processing circuitry 12 can comprise one or more processors, processing units, multi-core processors or modules that are configured or programmed to control the system 10 in the manner described herein. In particular implementations, the processing circuitry 12 can comprise a plurality of software and/or hardware modules that are each configured to perform, or are for performing, individual or multiple steps of the method described herein.

Briefly, the processing circuitry 12 of the system 10 is configured to acquire data associated with a cell of a network and process the acquired data associated with the cell of the network using a first machine learnt model to obtain one or more metrics indicative of the suitability of the cell for deployment as a MIMO cell. The processing circuitry 12 of the system 10 is also configured to generate an indication of whether the cell is suitable for deployment as a MIMO cell based on the one or more obtained metrics.

As illustrated in FIG. 1, the system 10 may optionally comprise a memory 14. The memory 14 of the system 10 can comprise a volatile memory or a non-volatile memory. In some embodiments, the memory 14 of the system 10 may comprise a non-transitory media. Examples of the memory 14 of the system 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the system 10 can be connected to the memory 14 of the system 10. In some embodiments, the memory 14 of the system 10 may be for storing program code or instructions which, when executed by the processing circuitry 12 of the system 10, cause the system 10 to operate in the manner described herein. For example, in some embodiments, the memory 14 of the system 10 may be configured to store program code or instructions that can be executed by the processing circuitry 12 of the system 10 to perform the method described herein. Alternatively or in addition, the memory 14 of the system 10 can be configured to store any requests, responses, indications, information, data, notifications, signals, or similar, that are described herein. The processing circuitry 12 of the system 10 may be configured to control the memory 14 of the system 10 to store any requests, responses, indications, information, data, notifications, signals, or similar, that are described herein. In some embodiments, for example, the processing circuitry 12 of the system 10 may be configured to control the memory 14 of the system 10 to store any one or more of the acquired data associated with the cell of the network, the one or more obtained metrics indicative of the suitability of the cell for deployment as a MIMO cell, and the generated indication of whether the cell is suitable for deployment as a MIMO cell.

In some embodiments, as illustrated in FIG. 1, the system 10 may optionally comprise a communications interface 16. The communications interface 16 of the system 10 can be connected to the processing circuitry 12 of the system 10 and/or the memory 14 of the system 10. The communications interface 16 of the system 10 may be operable to allow the processing circuitry 12 of the system 10 to communicate with the memory 14 of the system 10 and/or vice versa. The communications interface 16 of the system 10 can be configured to transmit and/or receive any requests, responses, indications, information, data, notifications, signals, or similar, that are described herein. In some embodiments, the processing circuitry 12 of the system 10 may be configured to control the communications interface 16 of the system 10 to transmit and/or receive any requests, responses, indications, information, data, notifications, signals, or similar, that are described herein.

Although the system 10 is illustrated in FIG. 1 as comprising a single memory 14, it will be appreciated that the system 10 may comprise at least one memory (i.e. a single memory or a plurality of memories) 14 that operate in the manner described herein. Similarly, although the system 10 is illustrated in FIG. 1 as comprising a single communications interface 16, it will be appreciated that the system 10 may comprise at least one communications interface (i.e. a single communications interface or a plurality of communications interface) 16 that operate in the manner described herein.

It will also be appreciated that FIG. 1 only shows the components required to illustrate an embodiment of the system 10 and, in practical implementations, the system 10 may comprise additional or alternative components to those shown.

Figure 2:
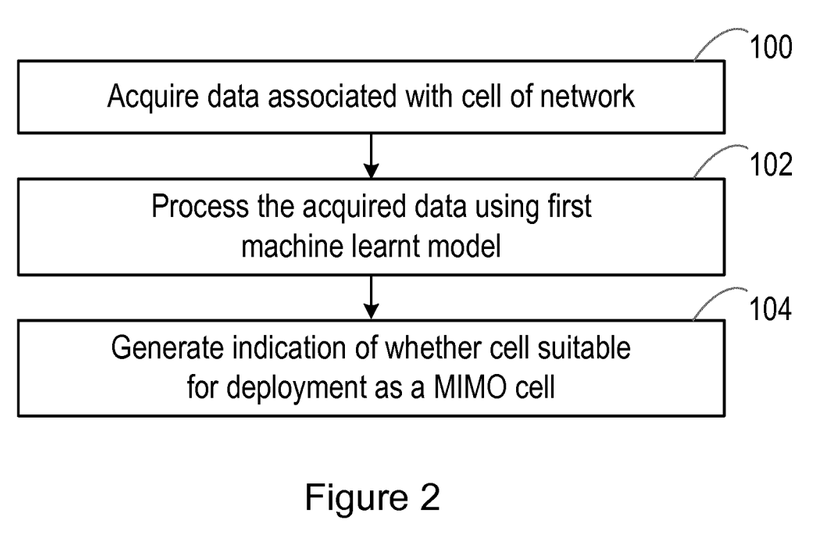
FIG. 2 is a flow chart illustrating a method according to an embodiment.

FIG. 2 is a flowchart illustrating a method for determining a suitability (or eligibility) of a cell of a network for deployment as a MIMO cell in accordance with an embodiment. The system 10 described earlier with reference to FIG. 1 is configured to operate in accordance with the method that will now be described. The method can be performed by or under the control of the processing circuitry 12 of the system 10. In some embodiments, the method may be performed for each cell of the network.

With reference to FIG. 2, at block 100, data associated with a cell of a network is acquired. More specifically, the processing circuitry 12 of the system 10 acquires the data associated with the cell of the network. The acquired data associated with the cell of the network can comprise any data associated with the cell of the network. For example, in some embodiments, the acquired data associated with the cell of the network may comprise data indicative of one or more properties of the cell of the network.

Examples of the one or more properties of the cell of the network include, but are not limited to, any one or more of a topology of the cell of the network, one or more physical properties of the cell of the network (e.g. an orientation and/or a height of at least one antenna in the cell of the network), one or more configuration management parameters (e.g. Radio Frequency (RF) configuration management parameters) of the cell of the network, one or more performance management counters of the cell of the network, one or more traces of at least one call within the cell of the network, a reference signal strength statistical measurement (e.g. signal strength distribution) for the cell of the network, a reference signal quality statistical measurement (e.g. reference signal quality distribution) for the cell of the network, a signal quality statistical measurement (e.g. signal quality distribution) for the cell of the network, a timing advance statistical measurement (e.g. timing advance distribution) for the cell of the network, a load of the cell of the network, statistics on a capability of at least one user equipment in the cell of the network to support deployment of the cell as a MIMO cell, a reference signal strength statistical measurement (e.g. a reference signal strength distribution) for the cell of the network for a predefined reference signal quality range, and a reference signal quality statistical measurement (e.g. a reference signal quality distribution) for the cell of the network for a predefined reference signal strength range.

At block 102 of FIG. 2, the acquired data associated with the cell of the network is processed using a first machine learnt model to obtain one or more metrics indicative of the suitability of the cell for deployment as a MIMO cell. More specifically, the processing circuitry 12 of the system 10 processes the acquired data using the first machine learnt model. In some embodiments, the first machine learnt model may comprise a neural network model, such as a deep neural network (DNN) model.

Although not illustrated in FIG. 2, in some embodiments, the method can comprise training the first machine learnt model. Thus, according to these embodiments, the processing circuitry 12 of the system 10 can be configured to train the first machine learnt model. The first machine learnt model may be trained based on one or more other networks. For example, in some embodiments, the first machine learnt model may be trained based on at least one other network after deployment of the at least one other network as a MIMO network. In some of these embodiments, the method can comprise adjusting one or more inputs of the first machine learnt model to compensate for the deployment of the at least one other network as a MIMO network. The adjustment can, for example, be based on any one or more of advice acquired from an expert and an observed behaviour of the at least one other network after temporarily deactivating the deployment of the at least one other network as a MIMO network. In some embodiments, the first machine learnt model may also be trained based on the at least one other network prior to deployment of the at least one other network as the MIMO network.

Returning back to FIG. 2, at block 104, an indication of whether the cell is suitable for deployment as a MIMO cell is generated based on the one or more obtained metrics. More specifically, the processing circuitry 12 of the system 10 generates the indication. The indication may also be referred to herein as a recommendation.

Although not illustrated in FIG. 2, in some embodiments, the method can comprise updating the first machine learnt model based on whether the cell is suitable for deployment as a MIMO cell. Thus, according to some embodiments, the processing circuitry 12 of the system 10 can be configured to update the first machine learnt model based on whether the cell is suitable for deployment as a MIMO cell.

Although also not illustrated in FIG. 2, in some embodiments, the method can comprise acquiring at least one map of the cell of the network and processing the at least one acquired map of the cell of the network using a second machine learnt model to extract one or more features of the cell of the network. Thus, according to these embodiments, the processing circuitry 12 of the system 10 can be configured to acquire the at least one map and process the at least one map in this way. In these embodiments, the acquired data associated with the cell of the network (which is acquired at block 100 of FIG. 2) can comprise the one or more extracted features of the cell of the network. The second machine learnt model is different to the first machine learnt model. In some embodiments, the second machine learnt model may comprise a neural network model, such as a convolutional neural network (CNN) model.

In some embodiments, the method can comprise training the second machine learnt model. Thus, according to these embodiments, the processing circuitry 12 of the system 10 can be configured to train the second machine learnt model. The second machine learnt model may be trained based on one or more other networks. For example, in some embodiments, the second machine learnt model may be trained based on at least one other network after deployment of the at least one other network as a MIMO network. In some of these embodiments, the method can comprise adjusting one or more inputs of the second machine learnt model to compensate for the deployment of the at least one other network as a MIMO network. The adjustment can, for example, be based on any one or more of advice acquired from an expert and an observed behaviour of the at least one other network after temporarily deactivating the deployment of the at least one other network as a MIMO network. In some embodiments, the second machine learnt model may also be trained based on the at least one other network prior to deployment of the at least one other network as the MIMO network.

In some embodiments involving the second machine learnt model, the method can comprise updating the second machine learnt model based on whether the cell is suitable for deployment as a MIMO cell. Thus, according to some embodiments, the processing circuitry 12 of the system 10 can be configured to update the second machine learnt model based on whether the cell is suitable for deployment as a MIMO cell.

Alternatively, in some embodiments, the method can comprise acquiring at least one map of the cell of the network and processing the at least one acquired map of the cell of the network to convert the at least one acquired map into a data set (e.g. histograms). Thus, according to these embodiments, the processing circuitry 12 of the system 10 can be configured to acquire the at least one map and process the at least one map in this way. In these embodiments, the acquired data associated with the cell of the network (which is acquired at block 100 of FIG. 2) can comprise the data set.

In some of the embodiments involving acquiring at least one map, the at least one acquired map of the cell of the network may comprises any one or more of a clutter map of the cell of the network and an elevation map of the cell of the network.

In some embodiments, the method may comprise determining a geolocation of at least one call within the cell of the network based on one or more traces of the at least one call and estimating a pixel value of the at least one acquired map of the cell of the network in the determined geolocation. Thus, according to these embodiments, the processing circuitry 12 of the system 10 can be configured to determine the geolocation and estimate the pixel value. In these embodiments, processing the data associated with the cell of the network (at block 102 of FIG. 2) can comprise processing the data associated with the cell of the network and the estimated pixel value of the at least one acquired map using the first machine learnt model to obtain the one or more metrics indicative of the suitability of the cell for deployment as a MIMO cell.

In some embodiments, the method described herein may be performed for each call within the cell of the network to generate a plurality of partial indications of whether the cell is suitable for deployment as a MIMO cell. In these embodiments, the method can comprise aggregating the plurality of partial indications to generate an overall indication of whether the cell is suitable for deployment as a MIMO cell. Thus, according to these embodiments, the processing circuitry 12 of the system 10 can be configured to aggregate the plurality of partial indications in this way. In some of the embodiments where the method described herein may be performed for each call within the cell of the network, the one or more properties of the cell of the network may comprise one or more key performance indicators (KPIs) associated with the cell of the network, such as one or more operations support systems (OSS) KPIs. In some embodiments, one or more KPIs associated with the cell of the network may be generated by combining one or more performance management counters of the cell of the network and/or using one or more traces of at least one call within the cell of the network.

The method described earlier will now be described in more detail with reference to some examples illustrated in FIGS. 3, 4, 5 and 6. The system 10 described earlier with reference to FIG. 1 can be configured to operate in accordance with any of the methods illustrated in FIGS. 3, 4, 5 and 6. The methods illustrated in FIGS. 3, 4, 5 and 6 can be performed by or under the control of the processing circuitry 12 of the system 10. Any of the methods illustrated in FIGS. 3, 4, 5 and 6 may be performed for each cell of the network according to some embodiments.

Figure 3:
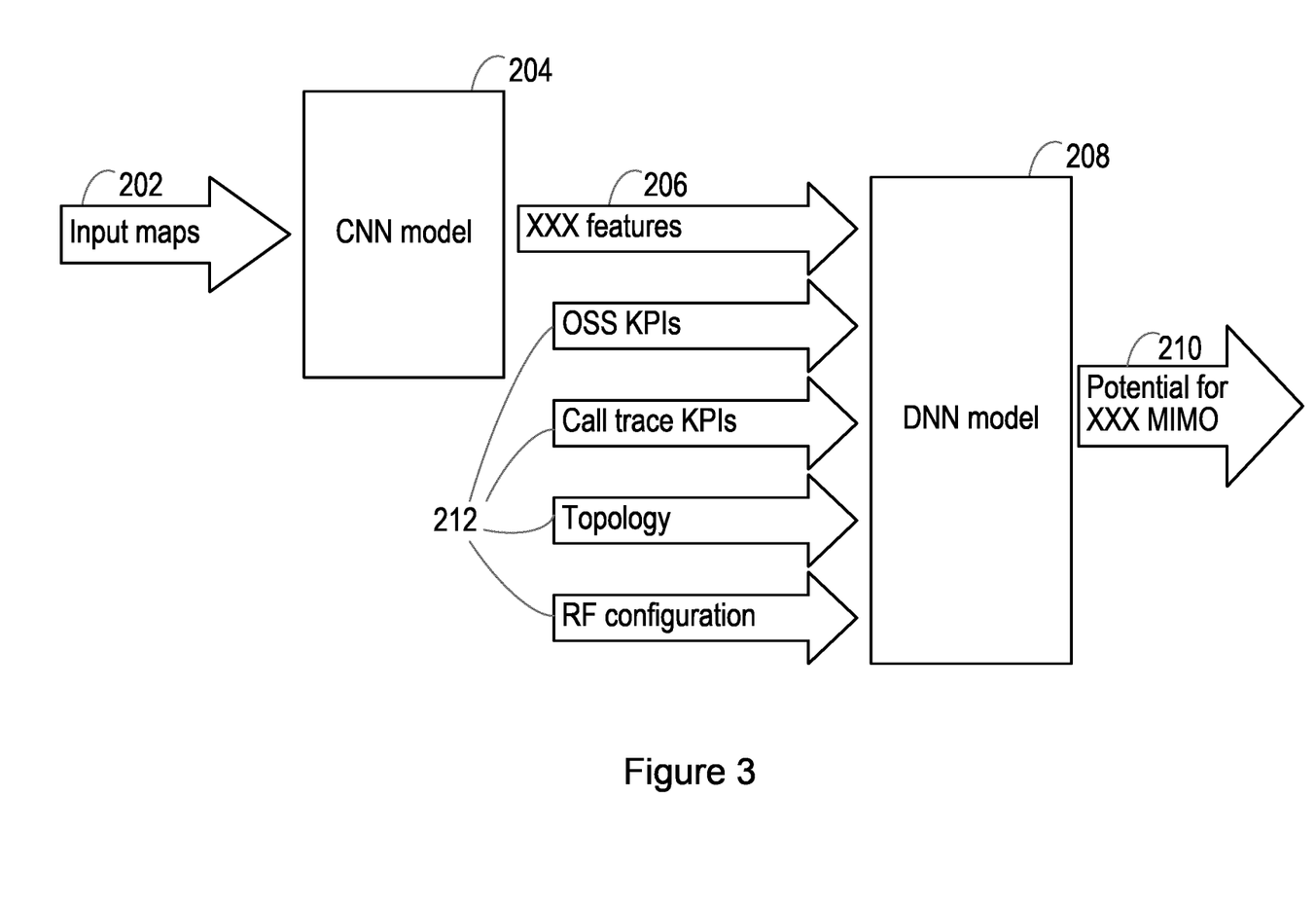
FIG. 3 is a block diagram illustrating a method according to an embodiment.

FIG. 3 is a block diagram illustrating a method for determining a suitability (or eligibility) of a cell of a network for deployment as a MIMO cell in accordance with an embodiment. The method illustrated in FIG. 3 may be referred to as a "cell-level approach". The method illustrated in FIG. 3 may also be described as an architecture "with full maps".

As illustrated in FIG. 3, at least one map 202 of the cell of the network is acquired and the at least one acquired map of the cell of the network is processed using the second machine learnt model 204 described earlier to extract one or more features 206 of the cell of the network. In this example, the second machine learnt model comprises a neural network model or, more specifically, a CNN model. However, it will be appreciated that any other machine learnt model may be used for the second machine learnt model.

As illustrated in FIG. 3, data 206, 212 associated with a cell of a network is acquired (as described earlier with reference to block 100 of FIG. 2). In the example illustrated in FIG. 3, the data 206, 212 comprises the one or more extracted features 206 of the cell of the network. The data 206, 212 also comprises data indicative of one or more properties 212 of the cell of the network. In the example illustrated in FIG. 3, the one or more properties 212 of the cell of the network comprise one or more KPIs (e.g. one or more OSS KPIs) associated with the cell of the network, one or more traces of at least one call within the cell of the network (e.g. one or more call trace KPIs), a topology of the cell of the network, and one or more configuration (e.g. RF configuration) management parameters of the cell of the network. However, it will be understood that any other data associated with the cell of the network (such as any of the examples mentioned earlier) and any combination of data associated with the cell of the network may be acquired.

As illustrated in FIG. 3, the acquired data 206, 212 associated with the cell of the network is processed using the first machine learnt model 208 described earlier to obtain one or more metrics indicative of the suitability of the cell for deployment as a MIMO cell (as described earlier with reference to block 102 of FIG. 2). In this example, the first machine learnt model comprises a neural network model or, more specifically, a DNN model. However, it will be appreciated that any other machine learnt model may be used for the first machine learnt model. The first machine learnt model and the second machine learnt model are different.

As illustrated in FIG. 3, an indication 210 of whether the cell is suitable for deployment as a MIMO cell is generated based on the one or more obtained metrics (as described earlier with reference to block 104 of FIG. 2). That is, an indication 210 of the potential for the cell to be deployed as a MIMO cell is generated.

Figure 4:
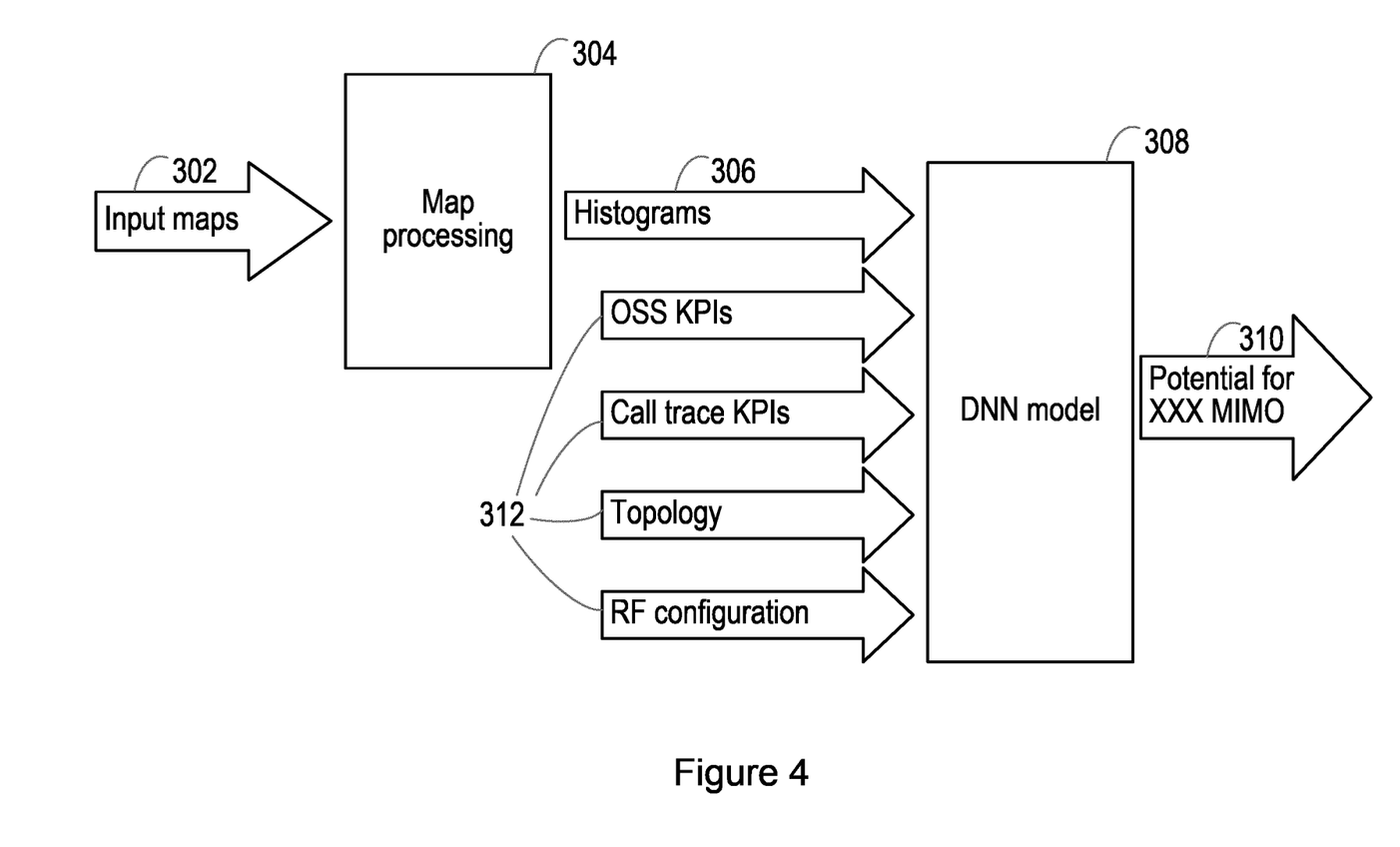
FIG. 4 is a block diagram illustrating a method according to an embodiment.

FIG. 4 is a block diagram illustrating a method for determining a suitability (or eligibility) of a cell of a network for deployment as a MIMO cell in accordance with an embodiment. The method illustrated in FIG. 4 may be referred to as a "cell-level approach". The method illustrated in FIG. 4 may also be described as an architecture "with pre-processed maps".

As illustrated in FIG. 4, at least one map 302 of the cell of the network is acquired and the at least one acquired map of the cell of the network is processed 304 to convert the at least one acquired map into a data set (e.g. histograms) 306. As also illustrated in FIG. 4, data 306, 312 associated with a cell of a network is acquired (as described earlier with reference to block 100 of FIG. 2). In the example illustrated in FIG. 4, the data 306, 312 comprises the data set 306. The data 306, 312 also comprises data indicative of one or more properties 312 of the cell of the network. In the example illustrated in FIG. 4, the one or more properties 312 of the cell of the network comprise one or more KPIs (e.g. one or more OSS KPIs) associated with the cell of the network, one or more traces of at least one call within the cell of the network (e.g. one or more call trace KPIs), a topology of the cell of the network, and one or more configuration (e.g. RF configuration) management parameters of the cell of the network. However, it will be understood that any other data associated with the cell of the network (such as any of the examples mentioned earlier) and any combination of data associated with the cell of the network may be acquired.

As illustrated in FIG. 4, the acquired data 306, 312 associated with the cell of the network is processed using the first machine learnt model 308 described earlier to obtain one or more metrics indicative of the suitability of the cell for deployment as a MIMO cell (as described earlier with reference to block 102 of FIG. 2). In this example, the first machine learnt model comprises a neural network model or, more specifically, a DNN model. However, it will be appreciated that any other machine learnt model may be used for the first machine learnt model.

As illustrated in FIG. 4, an indication 310 of whether the cell is suitable for deployment as a MIMO cell is generated based on the one or more obtained metrics (as described earlier with reference to block 104 of FIG. 2). That is, an indication 310 of the potential for the cell to be deployed as a MIMO cell is generated.

Figure 5:
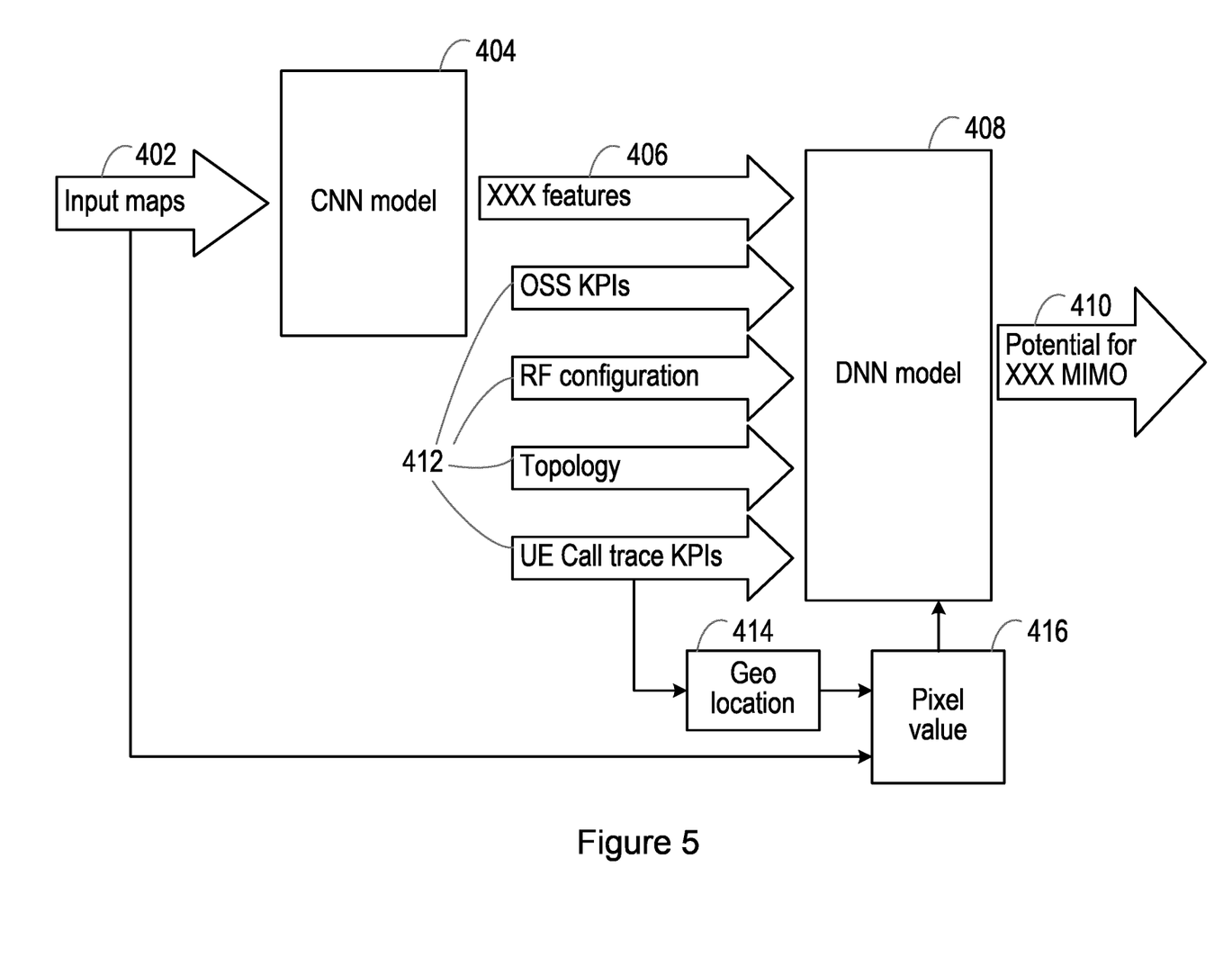
FIG. 5 is a block diagram illustrating a method according to an embodiment.

FIG. 5 is a block diagram illustrating a method for determining a suitability (or eligibility) of a cell of a network for deployment as a MIMO cell in accordance with an embodiment. The method illustrated in FIG. 5 may be referred to as a "call-level approach". The method illustrated in FIG. 5 may also be described as an architecture "with full maps".

As illustrated in FIG. 5, at least one map 402 of the cell of the network is acquired and the at least one acquired map of the cell of the network is processed using the second machine learnt model 404 described earlier to extract one or more features 406 of the cell of the network. In this example, the second machine learnt model comprises a neural network model or, more specifically, a CNN model. However, it will be appreciated that any other machine learnt model may be used for the second machine learnt model.

As illustrated in FIG. 5, data 406, 412 associated with a cell of a network is acquired (as described earlier with reference to block 100 of FIG. 2). In the example illustrated in FIG. 5, the data 406, 412 comprises the one or more extracted features 406 of the cell of the network. The data 406, 412 also comprises data indicative of one or more properties 412 of the cell of the network. In the example illustrated in FIG. 5, the one or more properties 412 of the cell of the network comprise one or more KPIs (e.g. one or more OSS KPIs) associated with the cell of the network, one or more configuration (e.g. RF configuration) management parameters of the cell of the network, a topology of the cell of the network, and one or more traces of at least one call within the cell of the network (e.g. one or more call trace KPIs). The one or more traces can be one or more user equipment (UE) call traces (e.g. one or more UE call trace KPIs). However, it will be understood that any other data associated with the cell of the network (such as any of the examples mentioned earlier) and any combination of data associated with the cell of the network may be acquired.

In the example illustrated in FIG. 5, a geolocation 414 of at least one call within the cell of the network is determined based on one or more traces of the at least one call. Also, a pixel value 416 of the at least one acquired map of the cell of the network is estimated in the determined geolocation. As illustrated in FIG. 5, the acquired data 406, 412 associated with the cell of the network and the estimated pixel value 416 of the at least one acquired map is processed using the first machine learnt model 408 described earlier to obtain one or more metrics indicative of the suitability of the cell for deployment as a MIMO cell (as described earlier with reference to block 102 of FIG. 2). In this example, the first machine learnt model comprises a neural network model or, more specifically, a DNN model. However, it will be appreciated that any other machine learnt model may be used for the first machine learnt model. The first machine learnt model and the second machine learnt model are different.

As illustrated in FIG. 5, an indication 410 of whether the cell is suitable for deployment as a MIMO cell is generated based on the one or more obtained metrics (as described earlier with reference to block 104 of FIG. 2). That is, an indication 410 of the potential for the cell to be deployed as a MIMO cell is generated.

Figure 6:
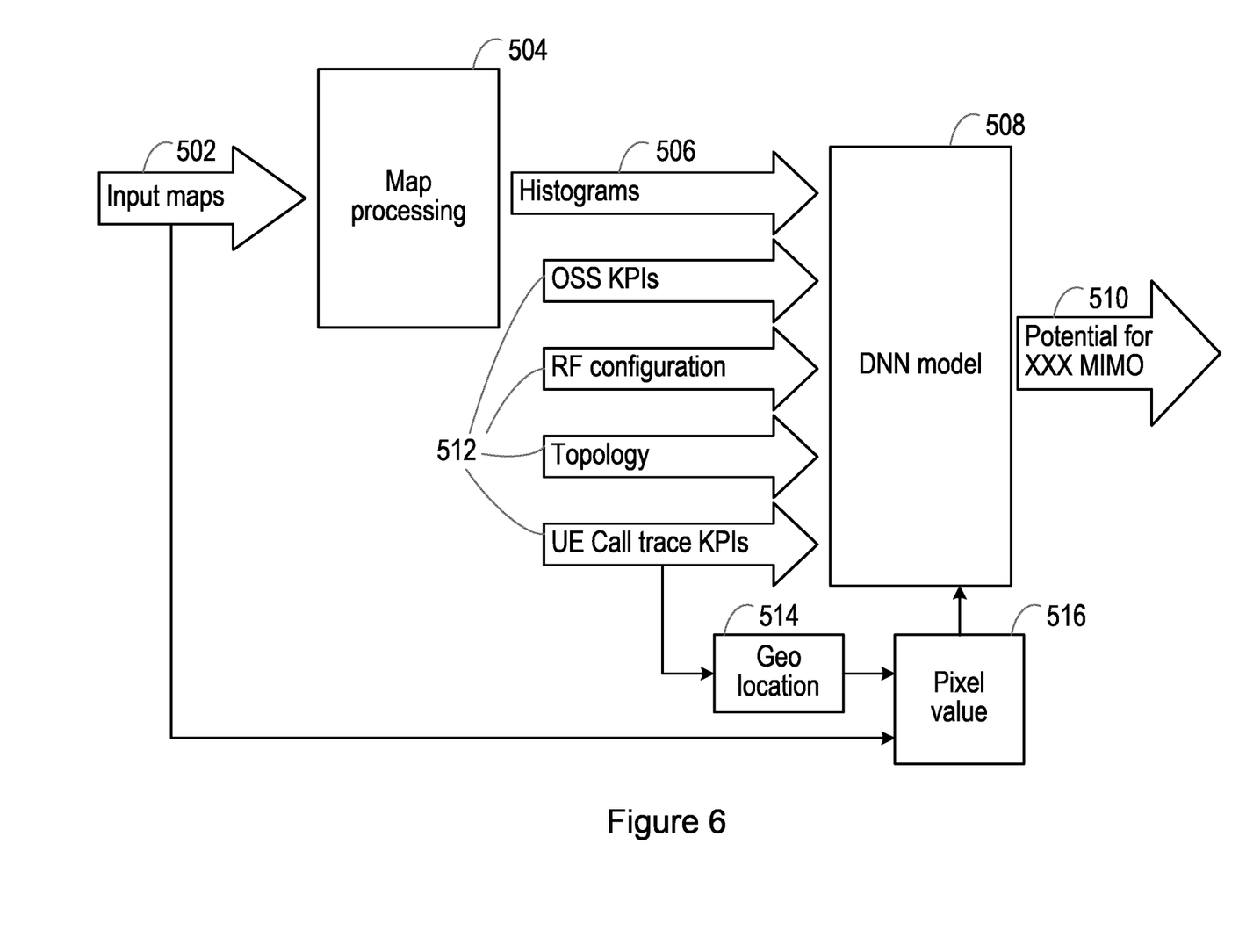
FIG. 6 is a block diagram illustrating a method according to an embodiment.

FIG. 6 is a block diagram illustrating a method for determining a suitability (or eligibility) of a cell of a network for deployment as a MIMO cell in accordance with an embodiment. The method illustrated in FIG. 6 may be referred to as a "call-level approach". The method illustrated in FIG. 6 may also be described as an architecture "with pre-processed maps".

As illustrated in FIG. 6, at least one map 502 of the cell of the network is acquired and the at least one acquired map of the cell of the network is processed 504 to convert the at least one acquired map into a data set (e.g. histograms) 506. As also illustrated in FIG. 6, data 506, 512 associated with a cell of a network is acquired (as described earlier with reference to block 100 of FIG. 2). In the example illustrated in FIG. 6, the data 506, 512 comprises the data set 506. The data 506, 512 also comprises data indicative of one or more properties 512 of the cell of the network. In the example illustrated in FIG. 6, the one or more properties 512 of the cell of the network comprise one or more KPIs (e.g. one or more OSS KPIs) associated with the cell of the network, one or more configuration (e.g. RF configuration) management parameters of the cell of the network, a topology of the cell of the network, and one or more traces of at least one call within the cell of the network (e.g. one or more call trace KPIs). The one or more traces can be one or more user equipment (UE) call traces (e.g. one or more UE call trace KPIs). However, it will be understood that any other data associated with the cell of the network (such as any of the examples mentioned earlier) and any combination of data associated with the cell of the network may be acquired.

In the example illustrated in FIG. 6, a geolocation 514 of at least one call within the cell of the network is determined based on one or more traces of the at least one call. Also, a pixel value 516 of the at least one acquired map of the cell of the network is estimated in the determined geolocation. As illustrated in FIG. 6, the acquired data 506, 512 associated with the cell of the network and the estimated pixel value 516 of the at least one acquired map is processed using the first machine learnt model 508 described earlier to obtain one or more metrics indicative of the suitability of the cell for deployment as a MIMO cell (as described earlier with reference to block 102 of FIG. 2). In this example, the first machine learnt model comprises a neural network model or, more specifically, a DNN model. However, it will be appreciated that any other machine learnt model may be used for the first machine learnt model.

As illustrated in FIG. 6, an indication 510 of whether the cell is suitable for deployment as a MIMO cell is generated based on the one or more obtained metrics (as described earlier with reference to block 104 of FIG. 2). That is, an indication 510 of the potential for the cell to be deployed as a MIMO cell is generated.

Thus, this disclosure proposes a novel method to evaluate the eligibility for a cell to have a well performing MIMO (or M-MIMO) deployment using machine learning technology. Eligibility can be based on a forecast of expected channel rank distribution when implementing an advanced antenna system in a certain location, or when enhancing to a system with higher number of antennas, compared to the associated financial cost that the deployment implies. A channel rank can be defined as the number of parallel transmission layers that can be achieved towards a certain user location is referred to as channel rank. Thus, a channel rank distribution can be defined as the distribution of parallel transmission layers that can be achieved towards a certain user location.

The proposed method can be applied to an operating cellular radio network (or a subset of operating cellular radio networks). An operating cellular radio network can be composed of a number of radio cells. The method can comprise the following phases (as previously described with respect to and as illustrated in FIG. 3):

1. Collection of input data associated with the operating network, such as any one or more of the following:
   Network topology, meaning site coordinates.
   Physical RF information, such as antenna height, azimuth or tilt.
   Configuration Management (CM) parameters from OSS.
   Performance Management (PM) counters from OSS, which are combined to produce KPIs.
   Call traces collected by OSS, which are used to obtain further custom counters for extra KPIs.
   Clutter and elevation grid maps.
2. Convolutional Neuronal Network processing, which may involve the following:
   The input clutter and elevation maps are processed by means of a machine leant model, such as one of more Convolutional Neural Networks (CNNs), and the extracted features are provided as input to another machine learnt model, such as a Deep Neural Network (DNN).
3. Deep Neuronal Network processing, which may involve the following:
   Based on the output of the CNN, the DNN carries out the prediction of the eligibility metrics at cell level, also considering the rest of aforementioned inputs.
4. Train the system for a network in which the required measurements are available before and after the deployment of a certain MIMO system. In this way, the system can be trained with:
   All the aforementioned inputs, collected for the baseline (e.g. 2×2 MIMO) scenario.
   An assessment of whether the advanced MIMO scheme (e.g. 4×4 MIMO) was worth the investment in each cell.

Once the system has been trained, it is ready to be used on a different network for the same initial and upgraded antenna system configurations. Advantageously, it is possible to also train the system with measurements collected once the deployment of a certain MIMO scheme has been carried out. In this case, a correction to the inputs may be beneficial to compensate for the effect of having implemented the advanced MIMO system, based on advice (e.g. site management evaluation advice) or based on observed behaviour after temporarily deactivating MIMO in a cluster.

Advantageously, it is possible to carry out the prediction of the (eligibility) metrics at call level to increase accuracy. Information per call can be extracted from call traces. A final recommendation per cell can be based on the aggregation of all the recommendations per call associated with each cell. Additionally, if the environment is suitable for sufficiently accurate geolocation based on call traces, the KPIs of the maps in the estimated location of the call can also feed the system as input (e.g. as described earlier with reference to FIG. 5), further increasing the accuracy of the solution.

Advantageously, it is possible to replace the CNN block with a simpler map processing module that generates new KPIs based on tiered distributions (e.g. as shown in FIGS. 4 and 6). This alternative reduces computational complexity at the expense of accuracy.

The advantages of the approach described herein include the following:
Detailed 3D databases of the areas of interest are not needed, which lowers cost and complexity remarkably.
It does not rely on theoretical assumptions about the materials and other aspects, which is expected to have a positive impact on accuracy and its predictability in an industrialized design environment.
No need for assumptions regarding the spatial user distribution, since its impact is implicitly embedded into the considered measurements.
Lighter computation requirements, which will drive cost down and facilitate speed and industrialization. The only part that may be more time consuming than desired is the training stage when using full maps. However, this part may be run less often, since models may be intended to be fully portable. This means that in some cases the only adjustment needed may come from incremental fine tuning.

Due to these advantages, the approach described herein is deemed suitable to scale and industrialize this aspect of the design process at a reasonable cost.

To forecast whether the channel rank distribution that can be expected when implementing an advanced antenna system (e.g. 4×4 MIMO, or M-MIMO) in a certain location is worth the investment, two different schemes are described to address the trade-off between complexity and accuracy. These schemes are referred to as the "cell-level approach" and the "call-level approach" respectively and examples of each of these schemes will now be described.

1.1 Cell-Level Approach
1.1.1 Cell-Level Approach—Inputs
This option consists of a machine learning algorithm (e.g. primarily based on artificial neural networks, although simpler traditional implementations can be also viable in certain scenarios) that carries out the prediction at cell level, based on the following non-exhaustive list of inputs, which are to be extracted from a network (or site or cluster) that is deemed a candidate for upgrade (e.g. a 2×2 MIMO network for which an upgrade to 4×4 MIMO is being considered):
1.1.1.1 Measurements from an OSS-Like System:
Cell-level reference signal strength distributions, e.g. Reference Signal Received Power (RSRP) in LTE.
Cell-level reference signal quality distributions, e.g. Reference Signal Received Quality (RSRQ) in LTE.
Cell-level signal quality (e.g. SNR) distributions or other proxy variables, such as the Channel Quality Indicator (CQI).
Cell-level timing advance distributions.
Cell load/utilization.
Statistics on the terminal capabilities regarding support for different MIMO schemes.
If possible, cross-distributions (which may already be available or may be obtained by means of call trace processing), such as, for example:
   Cell-level reference signal quality distributions for a certain reference signal strength range.
   Cell-level reference signal strength distributions for a certain reference signal quality range.

1.1.1.2 Other Measurements:

Network topology (e.g. site locations) and RF configuration (e.g. heights, azimuth, tilt, etc.).

Clutter, terrain and/or clutter height maps.

1.1.2 Cell-Level Approach—Architecture

The system can have one of the following two architectures, which again represent different trade-offs between accuracy and the computational power required for the training phase:

1.1.2.1 Architecture with Full Maps

In this case, full maps may be used as an input. As can be seen in FIG. 3, for example, the maps can be processed by means of Convolutional Neural Networks (CNNs) and the extracted features can be provided as input to a Deep Neural Network (DNN) together with the rest of the selected inputs according to some embodiments. This architecture yields the best possible accuracy at the expense of heavy computational load for training purposes.

1.1.2.2 Architecture with Pre-Processed Maps

With this alternative (for example, see FIG. 4), to lower the computational load during the training phase, maps can be pre-processed and converted into one of the two following data sets:

A distribution of, for example, the clutter type within the coverage area of the cell (e.g. identified by means of the timing advance distribution).

One distribution per ring, each ring being defined by a certain timing advance range

1.1.3 Cell-Level Approach—Training

To account for non-ideal scenarios, the two following training options are considered:

Train the system for a network in which the required measurements are available before and after the deployment of a certain MIMO system. In this way, the system can be trained with:

All the aforementioned inputs, collected for the baseline (e.g. 2×2 MIMO) scenario.

An assessment of whether the advanced MIMO scheme (e.g. 4×4 MIMO) was worth the investment, e.g. by assessing whether the measured channel rank distribution among the 4×4 capable User Equipments (UEs) is fulfilling some configurable criteria (e.g. (% rank3+% rank4)>X, and/or (% rank4)>Y).

If the previous option is not feasible, train the system with measurements that are collected once the deployment of a certain MIMO system has been carried out. Here, the only difference may be that some of the inputs may be adjusted to compensate for the effect of implementing the advanced MIMO system (e.g. signal level coverage boost for certain MIMO configurations). This can be performed in two ways:

Deterministic correction by means of expert advice.

Empirical correction by observing what happens after temporarily deactivating 4×4 MIMO in a cluster.

The models are expected to be highly portable from one network to another, and therefore new training (before application) is not expected to be needed. However, each new project may be used to further fine tune the model (a posteriori). To facilitate this, all the needed measurements may be collected and stored before and after the implementation of the advanced MIMO system.

1.2 Call-Level Approach

1.2.1 Call-Level Approach—Inputs

This option is similar to the previous one, with these main differences:

The prediction is carried out on a per-call basis.

To produce a recommendation for each cell, a prediction may be made for each user in the baseline configuration (e.g. 2×2 MIMO) and then a final recommendation may be generated by aggregating all the individual recommendations. For example, 4×4 MIMO may be recommended if the predicted aggregated utilization of ranks 3 and 4 fulfils certain configurable conditions.

Therefore, when carrying out the prediction for each call, the main inputs may come from the call trace associated with that call, together with OSS global KPIs such as the cell load and the timing advance. Note that, in this case, it is possible to derive much richer RF metrics by cross correlating RSRP, RSRQ and SNR/CQI on a per sample basis.

Of course, network topology and RF configuration may continue to be key, and so may be the clutter, terrain and/or clutter height maps.

Additionally (and optionally), if the environment is suitable for sufficiently accurate geolocation based on call traces, the value of the different maps in the estimated location of the call may also be fed as input to the system.

1.2.2 Call-Level Approach—Architecture

The architecture for this case may be as described earlier with reference to FIGS. 5 and 6, also covering the two alternatives for handling maps.

1.2.3 Call-Level Approach—Training

Since the prediction is made on a per call basis, it may be challenging to relate call traces from the baseline (e.g. 2×2 MIMO) network with traces in the network with the advanced MIMO system. Therefore, the simplest option may be to train the system with measurements (e.g. mainly call traces in this case) that can be collected once the deployment of a certain MIMO system has been carried out. Here, the only difference may be that some of the inputs may be adjusted to compensate for the effect of implementing the advanced MIMO system (e.g. signal level coverage boost for certain MIMO configurations). This can be performed in two ways:

Deterministic correction by means of expert advice.

Empirical correction by observing what happens after temporarily deactivating 4×4 MIMO in a cluster.

The models are expected to be highly portable from one network to another, and therefore new training (before application) is not expected to be needed. However, each new project may be used to further fine tune the model (a posteriori). To facilitate this, all the needed measurements may be collected and stored before and after the implementation of the advanced MIMO system.

The method described herein may be implemented in a data center. Whether the data center is inside the operator's network, in a corporate network or in a 3rd party entity depends on the contractual obligations, the associated cost and other logistic considerations such as the limitations to transfer data towards each considered data center. The method described herein may also be implemented as an application in the operations support system (OSS) of the network operator. The OSS based application may run as background continuously performing both calculation and training based on cells with or without MIMO configurations. The system can produce a continuous view on where potential for MIMO or improved MIMO exists. The idea described herein outlines an innovative process that leverages machine learning and artificial intelligence (AI) to forecast whether the channel rank distribution that can be expected when implementing an advanced antenna system (e.g. 4×4 MIMO, or M-MIMO) in a certain location is worth the investment.

The calculations can be based on, for example:

Readily available measurements in cellular networks (both at cell and/or call level), which eliminates guesswork and the application of theoretical models. Unlike the current state of the art, this is a purely data-driven approach.

Simple pieces of information, such as simple topology, RF configuration data and commonly used two-dimensional (2D) maps (e.g. clutter). These inputs are also easily available in the operators' planning and optimization department.

No ray tracing is used to predict the channel rank in the different locations. Such technique adds computational cost and is biased by the accuracy of the underlying data, which is sensitive to modelling issues and theoretical assumptions.

For those scenarios where processing full maps becomes unfeasible, an alternative method is described to use a light version of the maps consisting on one of the two approaches:

A distribution of, for example, the clutter type within the coverage area of the cell (e.g. identified by means of the timing advance distribution).

One distribution per ring, each ring being defined by a certain timing advance range.

The described system flexibly leverages the use of call traces:

To characterize the RF environment by means of cross-distributions in the cell-based approach.

To characterize the RF finger print for each call in the call-based approach.

Although the models are deemed portable, a feedback loop can be used to incrementally fine tune the model after each project. This is only an incremental adjustment that does not neglect all previously cumulated knowledge.

The model can be defined in such a way that it is very easy to generalize it to other radio access technologies. The model can be defined in such a way that it is very easy to include other pieces of information (or data) that may be considered important or become available at a later stage of the lifecycle of the technology.

Figure 7:
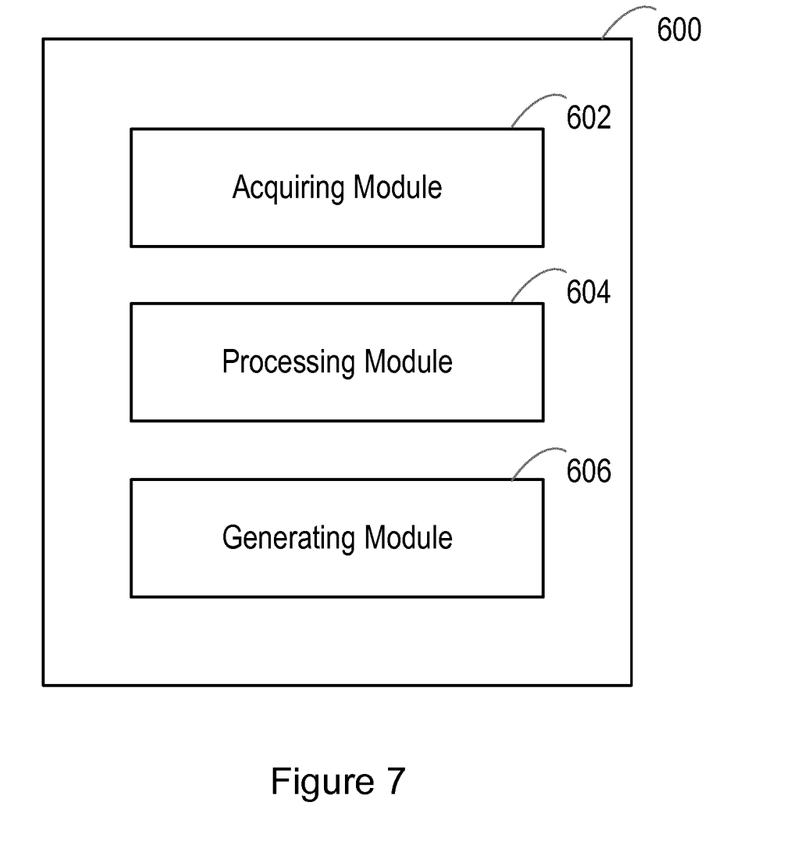
FIG. 7 is a block diagram illustrating a system according to an embodiment.

FIG. 7 is a block diagram illustrating a system 600 in accordance with another embodiment. The system 600 comprises an acquiring module 602 configured to acquire data associated with a cell of a network. The system 600 comprises a processing module 604 configured to process the acquired data associated with the cell of the network using a first machine learnt model to obtain one or more metrics indicative of the suitability of the cell for deployment as a MIMO cell. The system 600 comprises a generating module 606 configured to generate an indication of whether the cell is suitable for deployment as a MIMO cell based on the one or more obtained metrics. The system 600 may operate in the manner described herein.

The system functionality described herein can be performed by hardware. Thus, the system 10 described herein can be a hardware system. However, it will also be understood that at least part or all of the system functionality described herein can be virtualized. For example, the functions performed by the system 10 can be implemented in software running on generic hardware that is configured to orchestrate the system functionality. Thus, in some embodiments, the system 10 can be a virtual system. In some embodiments, at least part or all of the system functionality described herein may be performed in a network enabled cloud.

It will be understood that at least some or all of the method steps described herein can be automated according to some embodiments. That is, in some embodiments, at least some or all of the method steps described herein can be performed automatically. As such, an automated method for determining a suitability of a cell of a network for deployment as a MIMO cell can be provided according to some embodiments.

There is provided a computer program comprising instructions which, when executed by processing circuitry (such as the processing circuitry 12 of the system 10 described earlier), cause the processing circuitry to perform at least part of the method described herein. There is provided a computer program product, embodied on a non-transitory machine-readable medium, comprising instructions which are executable by processing circuitry (such as the processing circuitry 12 of the system 10 described earlier) to cause the processing circuitry to perform at least part of the method described herein. There is provided a computer program product comprising a carrier containing instructions for causing processing circuitry (such as the processing circuitry 12 of the system 10 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

The idea described herein introduces an innovative method to select candidate cells for advance antenna system deployment. Selection is based on machine learning technology to forecast whether a cell experiences such propagation environment that enables the generation of relatively isolated propagation paths for multi-layer transmission when implementing an advanced antenna system, which can range from a 4Tx antenna (to potentially apply 4×4 MIMO) to the deployment of more advanced M-MIMO antenna systems. In this context, the number of parallel transmission layers that can be achieved towards a certain user location is referred to as channel rank.

Thus, in the manner described, there is advantageously provided an improved technique for determining a suitability of a cell of a network for deployment as a MIMO cell.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Keywords

Machine learning, deep learning, MIMO, massive MIMO, site selection, network design, network planning, channel rank, multi-layer transmission, OSS, KPI Abbreviations

| Abbreviation | Explanation |
| --- | --- |
| AI | Artificial Intelligence |
| CNN | Convolutional Neural Network |
| CQI | Channel Quality Indicator |
| DNN | Deep Neural Network |
| LTE | Long Term Evolution |
| MIMO | Multiple Input Multiple Output |
| ML | Machine Learning |
| M-MIMO | Massive MIMO |
| RF | Radio Frequency |
| RSRP | Reference Signal Received Power |
| RSRQ | Reference Signal Received Quality |
| SNR | Signal to Noise Ratio |

REFERENCES

1) J. Voigt, R. Fritzsche, J. Schueler, "Optimal Antenna Type Selection in a Real SU-MIMO Network Planning scenario", Proc. IEEE 70th Vehicular Technology Conference Fall (VTC 2009-Fall), pp. 20-23, September 2009.
2) S. Zhang, A. Doufexi, and A. Nix, "Evaluating realistic performance gains of massive multi-user MIMO system in urban city deployments", in Proc. Int. Conf. Telecommun. (ICT), 2016, pp. 1-6.

The invention claimed is:

1. A method for determining a suitability of a cell of a network for deployment as a Multiple-Input Multiple-Output, MIMO, cell, having at least one of (a) more than two transmitting antennas and (b) more than two receiving antennas, the method comprising:
acquiring data associated with the cell of the network, the acquired data associated with the cell of the network comprising data indicative of one or more properties of the cell of the network, the one or more properties of the cell of the network comprising one or more of:
a topology of the cell of the network;
one or more physical properties of the cell of the network;
one or more configuration management parameters of the cell of the network;
one or more performance management counters of the cell of the network;
one or more traces of at least one call within the cell of the network;
a timing advance statistical measurement for the cell of the network;
a load of the cell of the network;
statistics on a capability of at least one user equipment in the cell of the network to support deployment of the cell as a MIMO cell;
processing the acquired data associated with the cell of the network using a first machine learnt model to obtain one or more metrics indicative of the suitability of the cell for deployment as a MIMO cell, the first machine learnt model comprising a neural network model, and the first machine learnt model being trained based on one or more other networks, and the first machine learnt model being trained based on at least one other network after deployment of the at least one other network as a MIMO network; and
generating an indication of whether the cell is suitable for deployment as a MIMO cell based on the one or more obtained metrics.

2. The method as claimed in claim 1, wherein one or more properties of the cell of the network comprise:
one or more key performance indicators associated with the cell of the network.

3. The method as claimed in claim 2, wherein one or more key performance indicators associated with the cell of the network are generated by at least one of:
combining one or more performance management counters of the cell of the network; and
using one or more traces of at least one call within the cell of the network.

4. The method as claimed in claim 1, the method comprising:
acquiring at least one map of the cell of the network; and
processing the at least one acquired map of the cell of the network using a second machine learnt model to extract one or more features of the cell of the network,
wherein the second machine learnt model is different from the first machine learnt model and the acquired data associated with the cell of the network comprises the one or more extracted features of the cell of the network.

5. The method as claimed in claim 4, wherein the second machine learnt model comprises a neural network model.

6. The method as claimed in claim 5, wherein:
the second machine learnt model comprises a convolutional neural network model.

7. The method as claimed in claim 4, wherein the second machine learnt model is trained based on one or more other networks.

8. The method as claimed in claim 7, wherein the second machine learnt model is trained based on at least one other network after deployment of the at least one other network as a MIMO network.

9. The method as claimed in claim 8, wherein the method further comprises:
adjusting one or more inputs of the second machine learnt model to compensate for the deployment of the at least one other network as a MIMO network.

10. The method as claimed in claim 9, wherein the adjustment is based on one or more of:
advice acquired from an expert; and
an observed behaviour of the at least one other network after temporarily deactivating the deployment of the at least one other network as a MIMO network.

11. The method as claimed in claim 8, wherein the second machine learnt model is trained based on the at least one other network prior to deployment of the at least one other network as the MIMO network.

12. The method as claimed in claim 4, the method further comprising:
updating the second machine learnt model based on whether the cell is suitable for deployment as a MIMO cell.

13. The method as claimed in claim 1, the method further comprising:
acquiring at least one map of the cell of the network; and
processing the at least one acquired map of the cell of the network to convert the at least one acquired map into a data set, wherein the acquired data associated with the cell of the network comprises the data set.

14. The method as claimed in claim 4, wherein the at least one acquired map of the cell of the network comprises one or more of:
a clutter map of the cell of the network; and
an elevation map of the cell of the network.

15. The method as claimed in claim 4, the method further comprising:
  determining a geolocation of at least one call within the cell of the network based on one or more traces of the at least one call; and
  estimating a pixel value of the at least one acquired map of the cell of the network in the determined geolocation,
  wherein processing the data associated with the cell of the network comprises:
    processing the data associated with the cell of the network and the estimated pixel value of the at least one acquired map using the first machine learnt model to obtain the one or more metrics indicative of the suitability of the cell for deployment as a MIMO cell.

16. The method as claimed in claim 1, wherein the first machine learnt model comprises a deep neural network model.

17. The method as claimed in claim 1, wherein the method further comprises:
  adjusting one or more inputs of the first machine learnt model to compensate for the deployment of the at least one other network as a MIMO network.

18. The method as claimed in claim 17, wherein the adjustment is based on one or more of:
  advice acquired from an expert; and
  an observed behaviour of the at least one other network after temporarily deactivating the deployment of the at least one other network as a MIMO network.

19. A system comprising:
  processing circuitry; and
  at least one memory for storing instructions which, when executed by the processing circuitry, cause the system to:
    acquire data associated with a cell of a network, the acquired data associated with the cell of the network comprising data indicative of one or more properties of the cell of the network, the one or more properties of the cell of the network comprising one or more of:
      a topology of the cell of the network;
      one or more physical properties of the cell of the network;
      one or more configuration management parameters of the cell of the network;
      one or more performance management counters of the cell of the network;
      one or more traces of at least one call within the cell of the network;
      a timing advance statistical measurement for the cell of the network;
      a load of the cell of the network;
      statistics on a capability of at least one user equipment in the cell of the network to support deployment of the cell as a MIMO cell;
    process the acquired data associated with the cell of the network using a first machine learnt model to obtain one or more metrics indicative of the suitability of the cell for deployment as a MIMO cell, the first machine learnt model comprising a neural network model, and the first machine learnt model being trained based on one or more other networks, and the first machine learnt model being trained based on at least one other network after deployment of the at least one other network as a MIMO network; and
    generate an indication of whether the cell is suitable for deployment as a MIMO cell based on the one or more obtained metrics.

20. The system as claimed claim 19, wherein the system is implemented as one of a node and a data center.

* * * * *